May 27, 1958     J. D. KELLY     2,836,793

METER ASSEMBLY

Filed Jan. 25, 1954     3 Sheets-Sheet 1

John D. Kelly
INVENTOR.

BY Browning, Simms & Hayes

ATTORNEYS

May 27, 1958  J. D. KELLY  2,836,793
METER ASSEMBLY
Filed Jan. 25, 1954  3 Sheets-Sheet 2

John D. Kelly
INVENTOR.

BY Browning, Simms & Hyer

ATTORNEYS

May 27, 1958     J. D. KELLY     2,836,793
METER ASSEMBLY
Filed Jan. 25, 1954     3 Sheets-Sheet 3
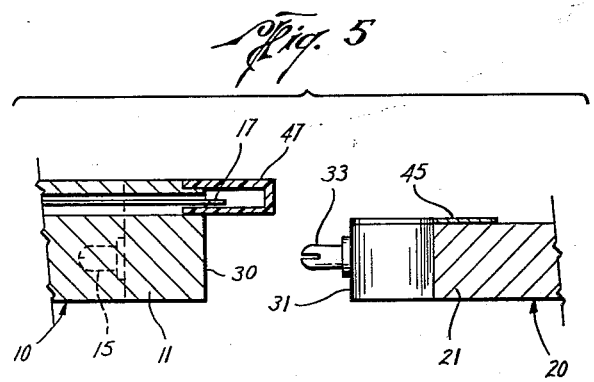
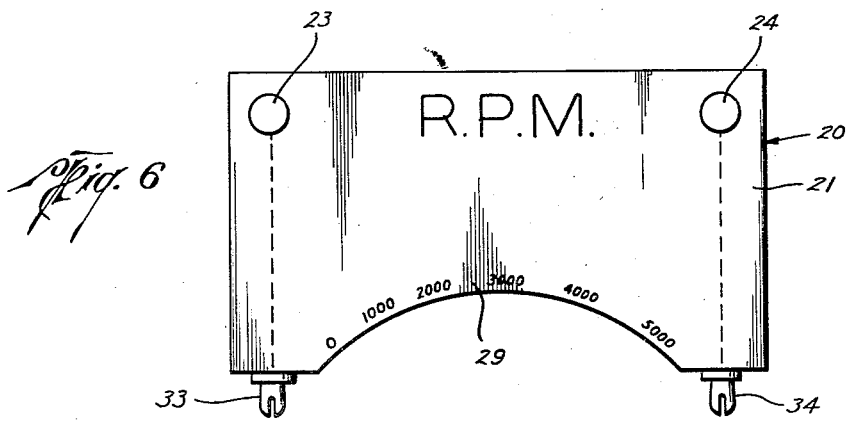
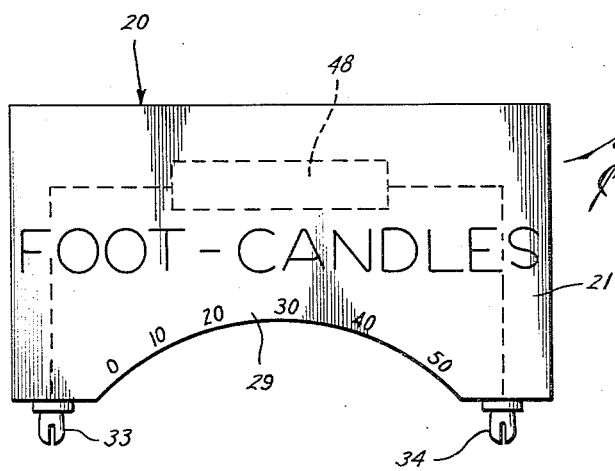
John D. Kelly
INVENTOR.
BY
ATTORNEYS

United States Patent Office 2,836,793
Patented May 27, 1958

2,836,793

METER ASSEMBLY

John D. Kelly, San Antonio, Tex.

Application January 25, 1954, Serial No. 405,842

8 Claims. (Cl. 324—115)

This invention relates to a meter assembly of the type employing at least one of a plurality of electrical elements or components to determine current flow through a current measuring means, such as multi-range ammeters, voltmeters and ohmmeters, lightmeters and the like.

In the past, ammeters and voltmeters have often been supplied with a shunt or a multiplier (series) resistance of predetermined value in order to determine the full-scale range exhibited by the meter. By varying the value of such resistance, the full-scale range can be varied as, for example, changed from 0–100 volt range to 0–10 volt range. The desire to vary the shunt or multiplier resistance value has resulted generally in two different types of meters. In the first type, the shunt or multiplier resistance is provided as a unit separate from the meter case containing the current measuring means, e. g. galvanometer, and is connected by suitable wiring to the latter. When it is desired to change the value of such resistance, it is usually disconnected from its wiring connections and replaced by a different resistor having a desired different value. Thus to change the full-scale range in this type of meter, it is necessary only to replace a relatively inexpensive resistance component with another of different size. The total investment in metering equipment is at a minimum for any given number of full-scale ranges because the same base meter, representing the bulk of investment, can be used with a suitable shunt or multiplier resistance to provide almost any desired full-scale range on the meter. One outstanding disadvantage encountered with this type of meter derives from the extra wiring connecting the shunt or multiplier resistance to the meter base which not only makes the meter difficult and cumbersome to handle but also tends to introduce inaccuracies in the meter reading due to poor connections, shorting and the like. While plate or strip shunt resistances have been suggested to eliminate the wiring problem, they are difficult and expensive to manufacture and frequently vary in effective resistance due to the exact mode of connection to the meter. Also, it is desirable to provide the meter with a corresponding scale for each shunt of multiplier resistance to be employed and this results in either affixing a multi-calibrated scale to the meter with attendant possibility of misreading or providing a plurality of separate interchangeable scales with resultant likelihood of using the wrong scale with a selected resistance.

The above disadvantages are minimized in the second type of meter which has a plurality of resistances of different values permanently mounted within the meter case, the selection between the various resistances being accomplished through switches or multiple binding posts or terminals. The disadvantages of this type meter are several. First, the different full-scale ranges which are desired must be selected before the meter is built or purchased; it is very difficult to make changes later. Secondly, a complete set of shunt or multiplier resistances must be built into the meter thus making the total investment quite high since the resistances and switching arrangement therefor may cost as much as the base meter itself. Third, the disadvantage of a multi-calibrated scale or replaceable individual scales is present in this type as well as in the first type explained above.

It would, therefore, be highly desirable to possess a meter having the flexibility, simplicity and versatility of the first type discussed above (external resistance) as well as the self-contained feature of the second type (internal resistance) while at the same time permitting a solution of the scale problem mentioned above.

It is therefore an object of this invention to provide a meter assembly which is essentially self-contained so as to be easily usable and which requires a minimum investment but yet which is made capable of many uses through interchangeable range determining or use determining adapters which can be successively combined with a single base meter in such a manner that the resulting assembly is a unitary structure.

Another object is to provide a meter assembly in which a base meter case containing a current measuring means is combined with an adapter case containing current determining element, the arrangement being such that any one of a plurality of interchangeable adapter cases, each containing a different current determining element, can be joined to the base meter case to place the particular current determining element in the circuit of the measuring means and providing thereby not only a unitary meter assembly but also one which is susceptible of rapid and easy modification to provide various full-scale ranges or different uses of the current measuring means.

Another object is to provide a meter assembly in which a base meter can be readily joined with any one of a plurality of adapter cases each containing a different current determining element, the assembly providing a scale properly aligned with indicia to permit readings to be taken, at least the indicia being carried by the adapter case so that the proper indicia will always be provided each time a different adapter case is joined to the base meter.

Another object is to provide such a meter assembly in which both the scale and indicia are carried by the adapter case so as to be positioned properly with respect to a pointing means carried by the base meter, each time the adapter case is joined to the base meter, the arrangement being such as to permit the case meter, including the pointing means, to be completely enclosed in a dust-tight case.

Another object is to provide a meter assembly in which a plurality of adapter cases can be interchangeably joined to a base meter to determine its use, the connection between the adapter case and base meter not only resulting in a relatively rigid assembly capable of convenient handling but also at the same time connecting a current determining element in the adapter case into the circuit of a current measuring means in the base meter and also properly aligning indicia carried by the adapter case with pointing means carried by the base meter so that accurate readings can be taken.

Another object is to provide an ammeter or voltmeter assembly which can have its full-scale range readily changed simply by substituting one adapter case containing a shunt or multiplier resistance, respectively, for another adapter case containing a resistance of different value such as to give the desired full-scale range, the substitution of adapter cases also providing a proper set of indicia corresponding to the full-scale range provided by the substituted adapter case and resistance thereby giving the base meter the versatile and economical characteristics of an external resistance type meter and also the unitary and convenience characteristics of an internal resistance type meter and also eliminating the scale problem existent in both such types of meters.

Other objects, advantages and features of this invention will be apparent to one skilled in the art upon consideration of the written specification, the appended claims and the attached drawings wherein:

Fig. 5 is a cross-sectional side view of the parts shown in Fig. 4; and

Figs. 6 and 7 illustrate further embodiments of adapters and specifically illustrate adapters for converting the base meter into a tachometer and light meter, respectively.

Like characters of reference are used throughout the several views to designate like parts.

Figure 1:
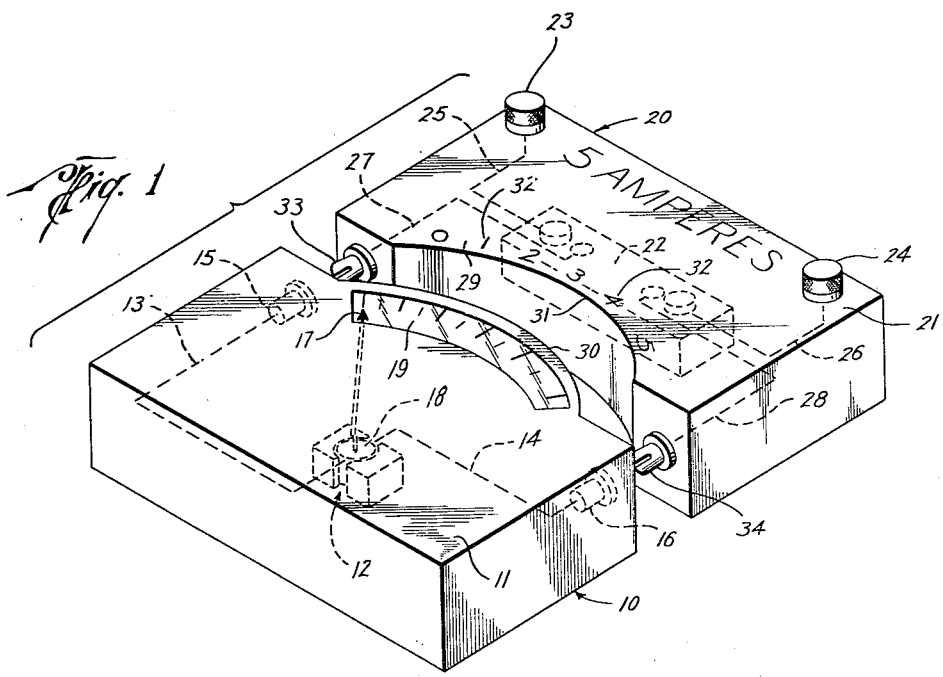
Fig. 1 is an exploded isometric view of an ammeter assembly embodying this invention and shows an adapter for modifying a base meter to provide a 0–5 ampere full-scale range.

Referring now to Fig. 1, a base meter 10 is comprised of a case 11 and a current measuring means 12, the latter being conventionally illustrated as a galvanometer. The galmanometer is provided with connecting leads 13 and 14 terminating respectively in instrument input terminals 15 and 16. The current measuring means includes a pointing means, such as pointer 17 carried by bearing 18 so that as current passes through the current measuring means, pointer 17 will be moved or deflected along scale 19 to indicate the magnitude of current flow.

In order to determine the proportion of current flow through the current measuring means and hence the full-scale range thereof, an adapter 20 is provided so as to be mountable in a predetermined position upon base meter case 11 and to provide, when so mounted, a current determining element in the circuit of current measuring means 12. Thus the illustrated adapter comprises a case 21 containing a current determining element 22, here shown as a shunt resistance. This resistance is connected at its terminals to input connectors 23 and 24 by means of wires 25 and 26, the input connectors being adapted to connect the ammeter assembly to an external circuit for measurement of current flow therein. The resistance is also tapped by wires 27 and 28 to provide the requisite current flow through the current measuring means for causing it to exhibit the desired full-scale range, here shown to be 0–5 amperes. Of course, it will be apparent from this description that the shunt resistance and the connections thereto can be arranged to give practically any desired full-scale range for the current measuring means and the illustrated 0–5 ampere range is not to be taken as limiting to the invention.

Adapter case 21 is provided with a portion 29 disposed, when the adapter is properly joined to the base meter, to lie adjacent and parallel to scale 19 and hence to the path of travel of pointer 17. Thus base meter case 11 and adapter case 21 can be provided with contiguous opposing faces 30 and 31, respectively, which have intermediate sections curving on an arc parallel to that of scale 19. Then by spacing indicia 32 along the curved section comprising adapter case portion 29, the indicia will be properly aligned with graduations on scale 19, when the adapter and base meter are assembled, to permit a proper reading to be taken. In this manner, each time a different adapter containing a different shunt resistance is joined to the base meter to change its full-scale range, a corresponding set of indicia are automatically provided to properly reflect the new full-scale range thereby eliminating the possibility of using an improper scale when reading the meter.

Means are provided for rigidly but detachably connecting or joining the selected adapter in a predetermined position to the base meter and connecting current determining element 22 (shunt resistance) into the circuit of current measuring means 12 so that a predetermined proportion of current flowing between connectors 23 and 24 will flow through the current measuring means. As shown, such means can comprise split friction prongs 33 and 34 which are adapted to be inserted into socket terminals 15 and 16 upon assembly of the adapter and base meter. These prongs and sockets are arranged on either side of the curved intermediate sections of end faces 30 and 31 so as to lend stability and rigidity to the assembled meter. At least portions of faces 30 and 31 can be in abutment when the meter is assembled in order to further increase this stability and rigidity. It will thus be seen that the prongs and sockets serve not only as means for mechanically joining the adapter and base meter but also to electrically join their respective electrical components.

From the foregoing, it will be seen that a plurality of adapter cases, each containing a different size or arrangement current determining element (shunt resistance) and having correspondingly different indicia thereon can be interchangeably and successively connected to a single base meter to change its full-scale range and yet there will always be provided an integral, self-contained meter assembly.

Figure 2:
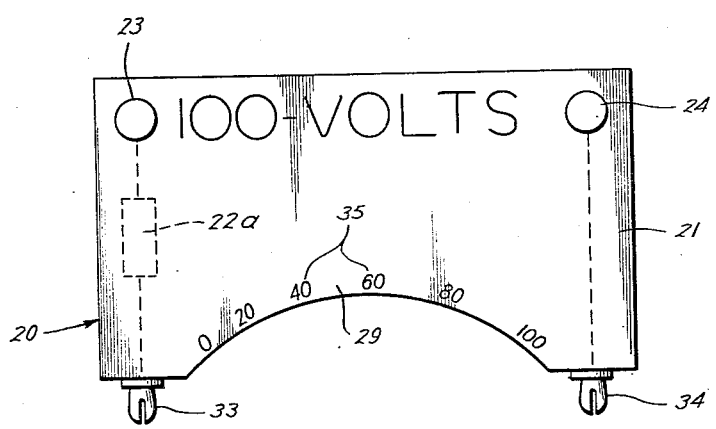
Fig. 2 is a view of another adapter useful with the base meter illustrated in Fig. 1 in converting it into a voltmeter having a full-scale range of 0–100 volts.

As a further example, the ammeter of Fig. 1 can be readily converted to a voltmeter by substituting the adapter of Fig. 2 for that of Fig. 1. The Fig. 2 adapter is essentially like that of Fig. 1 except that current determining element 22a (resistance) is connected between connectors 23 and 33 in such a manner that it is in series with current measuring means 12 in the assembled meter. It will therefore determine the full-scale range of the base meter and a proper set of indicia 35 are provided in the same manner as illustrated in Fig. 1. Obviously, by providing a plurality of the adapters each having a different resistance value, the full-scale range of the voltmeter assembly can be changed as desired.

Figure 3:
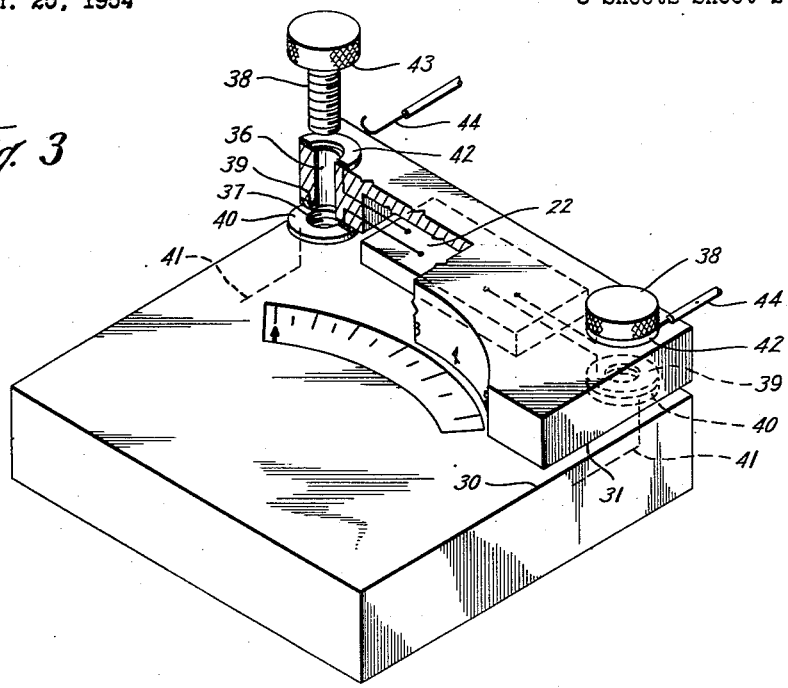
Fig. 3 illustrates, partially in section and partially in elevation, another embodiment of the assembly shown in Figs. 1 and 2 and particularly a different connecting or joining means for rigidly assembling the adapter and base meter together and also providing an electrical connection therebetween as well as binding posts for connecting the meter assembly to an external circuit.
Figure 4:
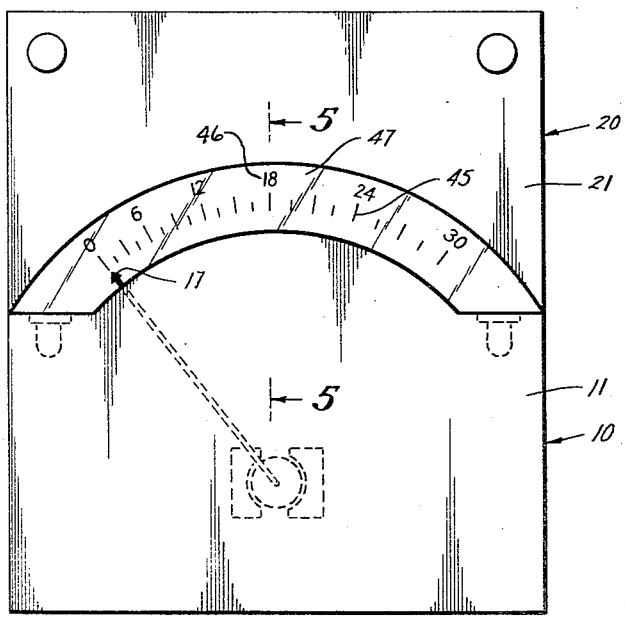
Fig. 4 is a front elevational view illustrating an arrangement permitting the adapter to carry both the scale and numerical indicia while permitting the base meter to be enclosed in a dust-tight housing, if desired.

Fig. 3 illustrates a different means for joining an adapter to the base meter and one which is somewhat more positive in its connection. Thus, the adapter and base meter are provided with aligned openings 36 and 37, the latter being threaded to receive bolts 38. Contact washers 39 and 40 are provided on end faces 31 and 30, respectively, so as to be in electrical contact when the meter is assembled. Contacts 40 are connected by lead wires 41 to the current measuring means (not shown) while contacts 39 are connected to the current determining element 22. The terminals of the latter are connected to input contacts 42. The bolts 38 each have a shoulder 43 so that they are adapted to act as binding posts to connect input leads 44 from an external circuit, to input contacts 42. In this manner, bolts 38 act not only as rigid members to join an adapter to a base meter but also as binding posts to provide connectors for placing the meter assembly in an external circuit.

The construction as thus far described is suitable under those conditions when pointer deflection is proportional to the quantity being measured in that a single standard scale is provided on the base meter and different sets of indicia upon the various adapters. In some instances, such as in an ohmmeter, a special scale should be provided. To permit this, the construction shown in Fig. 5 can be employed. Thus, a scale 45 as well as corresponding indicia 46 are carried by adapter 20 and pointer 17 is extended to overlie this scale. Then upon assembly of the meter, the end of the pointer moves along the scale on the adapter. In order to make the base meter 10 dust-tight and yet permit the pointer and scale to be visible, a transparent cap 47 can be provided on the upper part of the base meter case and laterally offset from the adapter, when in assembled position, so as to extend parallel and laterally contiguous to scale 45.

It will be apparent that, if desired, the scale-pointer arrangement of Fig. 5 can be used on all of the various types of adapters even when pointer deflection is proportional to the metered quantity as in Figs. 1 and 2. Such an arrangement would permit a single standard base meter to be used with any type of adapter irrespective of the nature of the scale.

While the above detailed description has been substantially devoted to ammeters and voltmeters, it is contemplated that the base meter can be combined with special adapters to provide many uses for a single base meter. Thus, in Fig. 6 an adapter is shown to be calibrated in revolutions per minute so that when it is assembled with the base meter and connected to a magneto, the meter assembly becomes a tachometer. Similarly, Fig. 7 shows a light meter or photometer having a photo-electric cell 48 connected to prongs 33 and 34 so that the output of cell 48 is measured by current measuring means 12 in the base meter to provide a reading in suitable units, such as foot-candles as illustrated. Examples of other adapters which can be provided are those for converting the meter assembly into a vacuum tube voltmeter, a resistance probe moisture detector for lumber, a Geiger counter, sound level meter, thermoelectric pyrometer, et cetera.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A meter assembly readily adaptable to a plurality of different uses which comprises, in combination, a first case, current measuring means in said first case including pointing means movable responsive to a change in current flow through the measuring means, an adapter case separable from said first case and mountable in a predetermined position thereon to form a part of the meter assembly, a current determining element in said adapter case, said adapter case having a portion with the adapter case mounted on the first case adjacent said pointing means and extending along the path of movement of the pointing means, a plurality of indicia on said portion and spaced along the path of movement of the pointing means whereby a reading can be taken, and terminals rigidly but detachably connecting said adapter case to said first case in said predetermined position and connecting said element into the circuit of said measuring means so as to determine the magnitude of current flow through said measuring means to thereby provide an integral self-contained meter assembly and yet permitting a plurality of adapter cases each containing a different current determining element and having different indicia on said portion thereof to be interchangeably and successively connected to a single one of said first cases to determine the use of the resulting meter assembly.

2. The assembly of claim 1 wherein said current determining element is a resistance shunting said current measuring means and wherein connectors are provided for connecting the current measuring means into an external circuit.

3. The assembly of claim 1 wherein said current determining element is a resistance connected in series with said current measuring means and wherein connectors are provided for connecting said current measuring means into an external circuit.

4. The assembly of claim 1 wherein a graduated scale is provided on the first case to extend along the path of travel of said pointing means, said adapter case portion with the adapter case in said predetermined position being disposed parallel to said scale with said indicia being spaced along said scale whereby each of said plurality of adapter cases can be provided with a set of indicia corresponding in values to the metered quantity to be represented when using a particular adapter case with said first case.

5. The assembly of claim 1 wherein said adapter case portion is provided with a graduated scale and indicia spaced therealong, said pointing means having a portion extending, with the adapter case in said predetermined position, to travel along said scale responsive to said change in current flow through said measuring means whereby both said scale and indicia are changed each time a different adapter case is mounted on said first case.

6. The assembly of claim 5 wherein said pointing means includes a pointer overlying said scale and enclosed in a transparent housing also overlying said scale whereby said first case can be made dust-tight and yet a plurality of said adapter cases each with a corresponding scale and indicia can be used therewith.

7. The assembly of claim 6 wherein said first and adapter cases have abutting endwise faces therebetween with said adapter case in said predetermined position thereby lending rigidity to the assembly.

8. In a meter assembly readily adaptable to a plurality of different uses, the combination which comprises two cases separable from each other but adapted to be joined together as a rigid unit, current measuring means in one of said cases including pointing means movable responsive to a change in current flow through said measuring means and a current determining element in the other case, terminals releasably but rigidly joining said cases together and releasably connecting said element and said measuring means in an internal circuit so that the rate of current flow through said measuring means is determined by said element, said other case having a face portion disposed, with the cases joined together, along the path of travel of said pointing means, and indicia spaced along said face portion whereby a meter reading can be taken.

References Cited in the file of this patent

UNITED STATES PATENTS

| | | |
|---|---|---|
| 1,660,285 | Weston | Feb. 21, 1928 |
| 1,763,178 | Pierce | June 10, 1930 |
| 2,043,495 | Sanger | June 9, 1936 |
| 2,101,296 | Simpson | Dec. 7, 1937 |
| 2,325,179 | Doering | July 27, 1943 |
| 2,528,640 | Coleman | Nov. 7, 1950 |